Nov. 12, 1963
G. A. SMITH
3,110,164
HEAT PUMPS
Filed Sept. 28, 1961
2 Sheets-Sheet 1
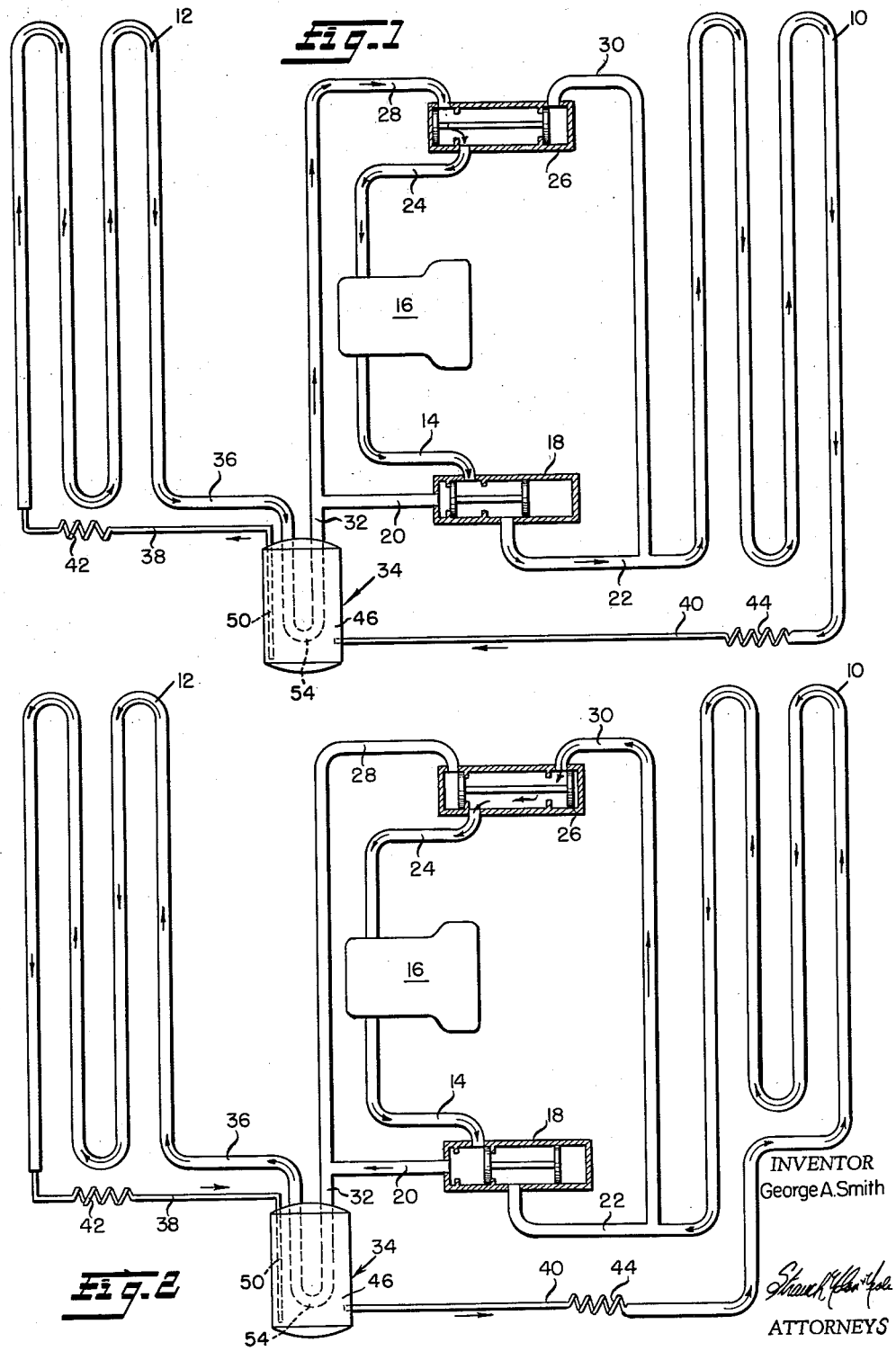
INVENTOR
George A. Smith
ATTORNEYS Nov. 12, 1963    G. A. SMITH    3,110,164
HEAT PUMPS Filed Sept. 28, 1961    2 Sheets-Sheet 2

INVENTOR
George A. Smith

Strauch, Nolan + Neale
ATTORNEYS

United States Patent Office 3,110,164
Patented Nov. 12, 1963

3,110,164
HEAT PUMPS
George A. Smith, Tampa, Fla., assignor to Hupp Corporation, Cleveland, Ohio, a corporation of Virginia
Filed Sept. 28, 1961, Ser. No. 141,331
6 Claims. (Cl. 62—324)

This invention relates to heat pumps and more particularly to novel means for automatically modulating the effective charge of refrigerant in the system under different operating conditions, especially as the cycle of the heat pump is reversed.

As is well known in the art, heat pumps comprise indoor and outdoor coils or heat exchangers connected in a closed refrigerant circuit. Refrigerant is circulated through the coils by a compressor which draws the refrigerant from one coil, compresses the refrigerant and delivers the compressed refrigerant to the other coil where it is condensed and passes through a capillary tube or expansion valve to the first coil for evaporation. The system includes suitable change-over valve mechanism for reversing the functions of the indoor and outdoor heat exchangers permitting the indoor heat exchanger to function as the evaporator for summertime cooling or as the condenser for wintertime heating, the outdoor coil performing the opposite function.

It has been recognized in the art that optimum operation of heat pumps on the cooling cycle, i.e., when the indoor heat exchanger is being used as the evaporator, requires a greater effective charge of refrigerant than that required for operation on the heating cycle, when the indoor coil is functioning as the condenser. Prior known attempts to satisfy this requirement have met with indifferent success. Most of them have necessitated the employment of relatively complex, expensive apparatus which increased initial cost and maintenance cost or have achieved simplicity only at the sacrifice of operating effectiveness.

It is a principal purpose and object of the present invention to provide novel means for accumulating a portion of the refrigerant charge during the heating cycle and for restoring the accumulated portion of the charge to the system during the cooling cycle automatically and with highly simplified, yet completely effective, apparatus.

It is a further object of the present invention to provide improved apparatus for regulating the effective charge of refrigerant in the system under widely varying conditions which may be readily incorporated in existing heat pump systems of otherwise conventional construction.

It is also an object of the present invention to provide improved charge controlling means for heat pumps in which the amount of refrigerant effectively removed from the system during the heating cycle is automatically regulated in accordance with the requirements of the system, the maximum amount of refrigerant so removed being adjustably predetermined.

In attaining these and other objects, the present invention provides a storage tank in open communication with the liquid refrigerant line, the tank and the liquid line being arranged to permit flow of liquid refrigerant through the tank on both the heating and cooling cycles. Also contained in the tank is a gas line arranged in heat exchange relation with the liquid in the tank. The gas line is so connected in the system that it contains hot gas when the heat pump is operated on the cooling cycle and contains relatively cool gas when the heat pump is operated on the heating cycle. The heat released by the hot gas on the cooling cycle evaporizes a sufficient portion of the liquid refrigerant to substantially evacuate the tank, forcing the liquid refrigerant into the system.

Additional objects and advantages will become apparent as the description proceeds in connection with the accompanying drawings in which:

FIGURE 1 is a diagrammatic view of the overall heat pump system incorporating the apparatus of the present invention, the system being shown on the heating cycle;

FIGURE 2 is a similar view showing the unit on the cooling cycle;

Figure 3:
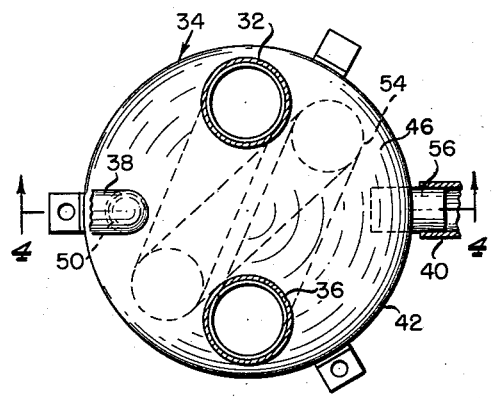
FIGURE 3 is a top plan view of the refrigerant accumulator heat exchanger assembly which forms an important component of the present invention.

Referring now more particularly to the drawings, the heat pump system to which the present invention is applied includes the indoor and outdoor coils 10 and 12, respectively, which may be of any suitable form known in the art. In accordance with the conventional practice fans (not shown) are provided to move air over the coils. Alternately, the outdoor coil may be water-cooled. The discharge line 14 of the compressor 16 leads to a changeover valve 18 adapted to connect the line 14 alternately to delivery lines 20 and 22. The suction line 24 of the compressor is connected to a changeover valve 26 adapted to connect the suction line 24 alternately to return conduits 28 or 30. The changeover valves are of conventional construction and are adapted to be shifted simultaneously by members not shown to operate the system on the heating or cooling cycles.

If desired, a conventional single four-way changeover valve may be used in place of the two valves 18 and 26 to connect lines 14, 20, 22, 24, 28 and 30 for providing the same function.

Figure 4:
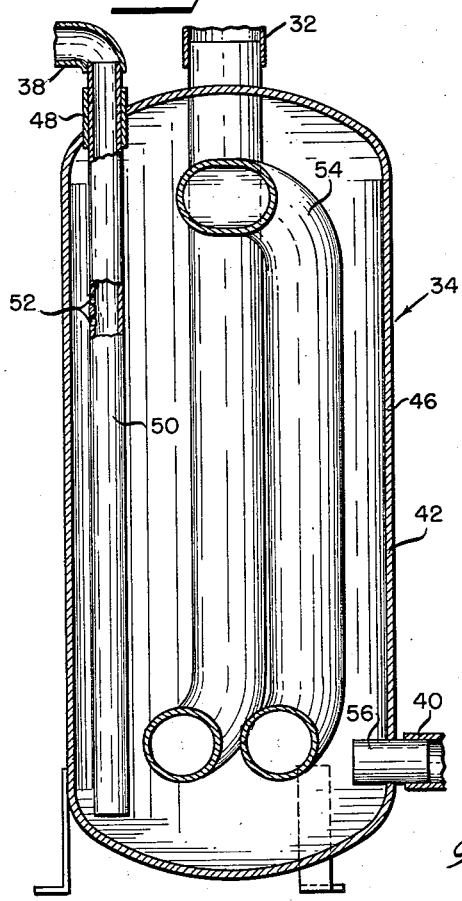
FIGURE 4 is a central vertical section taken along line 4—4 of FIGURE 3.

The lines 22 and 30 are connected to one side of the coil 10 while the lines 20 and 28 are connected to a line 32 leading to one side of the heat exchanger accumulator assembly 34. The opposite side of the assembly 34 is connected by a line 36 to the outdoor coil 12. The refrigerant circuit is completed by liquid lines 38 and 40 containing capillaries 42 and 44, respectively, the liquid lines 42 and 44 being connected through the heat exchanger accumulator tank assembly 34 as best shown in FIGURES 3 and 4.

The assembly 34 includes a tank 46 which is of elongated cylindrical configuration. A coupling 48 at the top of the tank carries a dip tube 50, the upper end of which projects outwardly of the tank for connection to the liquid line 38 and the lower end of which is open adjacent the bottom of the tank. Side openings 52 are provided in the tube 50 for a purpose to appear. Top openings are also provided in the tank through which the opposite ends of a coiled section of tubing 54 extend for connection to the gas lines 32 and 36. Because of the relatively large diameter of the tubing 54 and the utilization of at least one full coil, a large heat emitting surface is formed within the tank 46 to promote rapid heat exchange between the tubing and the contents of the tank. A coupling 56 extends laterally through the wall of the tank 46 adjacent to its lower end for connection to the fluid line 40.

While the dimensions of the components of the system may be varied widely to accommodate the needs of the varying installations, in a typical case the tank is approximately 11" long and has a diameter of approximately 5". The outside diameter of the coupling 48 and the associated lines 50 and 38 will be in the neighborhood of 5/8" while the coil 54 and its associated lines 32 and 36 are in the neighborhood of 1 1/8" diameter.

The operation of the system will now be described, assuming that the changeover valves 18 and 26 have been set to operate the unit on the heating cycle, with the indoor coil 10 functioning as the condenser and the outdoor coil 12 functioning as the evaporator. Thus, the compressor discharge conduit 14 is connected to the conduit 22, the compressor suction line 24 is connected to the conduit 28 and the conduits 20 and 30 are closed. The hot gas thus passes to the indoor coil where it is condensed and the liquid passes through the capillary 44 and is led into the bottom of the tank 46 through the liquid line 40. As the liquid refrigerant is introduced from the conduit 40 the level of the liquid within the tank continues to rise until it covers the openings 52 in the dip tube 50. The trapped vapor above the openings 52 prevents further accumulation of liquid within the tank and the incoming liquid introduced through conduit 40 causes an equal amount of liquid to leave the tank through the conduit 38 for passage through the capillary 42, evaporation in the outdoor coil 12 and return to the compressor 16 through the conduit 36, the tube coil 54 and the conduit 28. Since the coil 54 is in the suction line, the gas therein is relatively cool and the temperature in the interior of the tank 46 is rapidly reduced thus reducing the vapor pressure in the tank.

The capacity of the tank 46 and the height of the openings 52 are selected so that the amount of refrigerant in the system during the heating cycle produces optimum operation of the system.

The effective capacity of the tank can be altered either by changing its dimensions or by substituting a new dip tube 50 having openings placed at a different level.

The system is operated on the cooling cycle, that is, in a manner to use the indoor coil 10 as the evaporator and the outdoor coil 12 as the condenser by repositioning the changeover valves 18 and 26 to connected the compressor discharge line 14 to the line 20 and to connect the compressor suction line 24 to the line 30 thus reversing the gas and liquid flow through the system. The changeover valves are so arranged as to block flow through the conduits 22 and 28 during the cooling cycle. After a brief period of operation on the cooling cycle, the coil 54 within the tank 46 becomes hot due to the constant flow of hot gas through it. The portion of the refrigerant within the tank in the vapor phase is thus rapidly increased, forcing the liquid refrigerant in the tank back into the system.

Normally the liquid level is stabilized on the cooling cycle at the level of the coupling 56 which now serves as the outlet for the refrigerant. Again it is a relatively simple matter to determine the specific dimensions of the tank and the components within the tank to restore a sufficient amount of accumulated refrigerant to the circuit to assure optimum operation on the cooling cycle.

The through flow of both the hot gas and the liquid refrigerant in the heat exchanger accumulator tank assures the maintenance of a stability of operation which is not possible if the tank were connected in parallel with either of the circuits and the constant heat exchange relation between the gas and liquid conduits is an important feature of the present invention in achieving properly balanced operation.

The system has an anti-slugging feature so that compressor 16 is assured that gaseous fluid is returned through intake line 24 instead of liquid slugs which would interfere with compressor operation. During the heating cycle in FIG. 1, coil 54 in FIG. 4 leading to compressor inlet line 24 in FIG. 1 is surrounded by relatively warm fluid in tank 46 so that any liquid slug occurring in coil 54, because of sudden changes in operating conditions, is boiled off within coil 54 and the compressor is assured of gaseous return in its intake line 24. Since the danger of slugging exists primarily on the heating cycle in FIG. 1, the system makes no specific provision for anti-slugging protection during the cooling cycle by heating the fluid entering compressor inlet line 24 during the cooling cycle in FIG. 2 to provide anti-slugging protection. However, during the cooling cycle in FIG. 2, heat exchanger assembly 34 stabilizes the refrigerant charge. The raised temperature of coil 54 causes high vapor pressure within tank 46 so as to prevent accumulation of liquid in tank 46 to give a stabilized, or constant quantity, refrigerant charge circulating through the system during the cooling cycle. The vapor pressure keeps the liquid in tank 46 at a level below hot coil 54 to minimize heat transfer so as to keep the liquid as cool as possible because the vapor is a poor thermal conductor from hot coil 54. However, this level still permits liquid travel between the lower end of tube 50 and the end of coupling 56 without contacting hot coil 54 because the lower portions of these ends are below coil 54.

The word "fluid," as used herein, is intended to include generically liquid, gaseous, and vapor refrigerant.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A heat pump comprising: an indoor coil; an outdoor coil; a compressor; conduit means including gas lines and liquid lines providing a closed refrigerant circuit connecting said compressor and said coils; changeover valve mechanism in said circuit for selectively connecting the discharge side of said compressor to said indoor coil on the heating cycle or to said outdoor coil on the cooling cycle while connecting the suction side of said compressor to the other coil; said gas lines including a section connected to the discharge side of said compressor on the cooling cycle and to the suction side of said compressor during the heating cycle; a tank enclosing said section of said gas lines, and said tank forming a portion of said liquid lines said liquid thereby flowing through said tank in heat exchange relation with said section of said gas lines whereby the portion of said refrigerant in the liquid phase in said tank is controlled by the temperature of the gas passing through said section of said gas lines.

2. The combination according to claim 1, wherein said tank is connected to said liquid lines by means forming an opening leading into the bottom of said tank and means forming an opening in the top of said tank, and a dip tube extending from said opening in the top of said tank to a point adjacent the bottom of said tank, the lower end of said dip tube being in open communication with interior of said tank, and said dip tube having openings intermediate its ends also in communication with the interior of said tank.

3. A heat pump comprising: an indoor coil; an outdoor coil; a compressor; conduit means including fluid lines providing a closed refrigerant circuit connecting said compressor and said coils; changeover valve mechanism in said circuit for selectively connecting the discharge side of said compressor to said indoor coil on the heating cycle or to said outdoor coil on the cooling cycle while connecting the suction side of said compressor to the other coil; said fluid lines including a first section connected to the discharge side of said compressor on the cooling cycle and to the suction side of said compressor during the heating cycle and a second section of said fluid lines in heat exchange relationship with said one section, one of said sections including a fluid tank whereby the portion of said refrigerant fluid in said tank is controlled by the temperature of the fluid passing through the other of said sections.

4. A heat pump comprising: an indoor coil; an outdoor coil; a compressor; conduit means including fluid lines providing a closed refrigerant circuit connecting said compressor and said coils; changeover valve mechanism in said circuit for selectively connecting the discharge side of said compressor to said indoor coil on the heating cycle or to said outdoor coil on the cooling cycle while connecting the suction side of said compressor to the other coil; said fluid lines including a first section connected to the discharge side of said compressor on the cooling cycle and to the suction side of said compressor during the heating cycle and a second section of said fluid line being in the outlet from said indoor coil during the heating cycle and in heat exchange relationship with said one section whereby the fluid entering the suction side of said compressor through said first section during only the heating cycle is warmed by the fluid in said second section to assure gaseous fluid flow entering the suction side, one of said sections including a tank for the storage of refrigerant.

5. A heat pump, as set forth in claim 1, with the inlet and outlet to said tank located below said section whereby the liquid in said tank during the cooling cycle is kept as cool as possible by being normally out of thermal contact with said section.

6. A heat pump comprising: an indoor coil; an outdoor coil; a compressor; conduit means including gas lines and liquid lines providing a closed refrigerant circuit connecting said compressor and said coils; changeover valve mechanism in said circuit for selectively connecting the discharge side of said compressor to said indoor coil on the heating cycle or to said outdoor coil on the cooling cycle while connecting the suction side of said compressor to the other coil; said gas lines including a section connected to the discharge side of said compressor on the cooling cycle and to the suction side of said compressor during the heating cycle; a tank enclosing said section of said gas lines; means connecting a liquid line connected to said indoor coil to the interior of said tank adjacent the bottom thereof; a dip tube extending from the top of said tank to the region adjacent the bottom of said tank, the lower end of said dip tube being in open communication with the interior of said tank; means connecting the liquid line connected to said outdoor coil to the top of said dip tube; and said dip tube having openings disposed at a predetermined height in said tank whereby on said cooling cycle liquid enters said tank through the bottom of said dip tube and exits from said tank at a point adjacent the bottom thereof and on said heating cycle liquid enters said tank adjacent the bottom thereof and tends to fill said tank substantially to the level of said openings before exiting from said tank through said dip tube.

References Cited in the file of this patent
UNITED STATES PATENTS

| | | |
|---|---|---|
| 2,589,384 | Hopkins | Mar. 18, 1952 |
| 2,715,317 | Rhodes | Aug. 16, 1955 |
| 2,867,094 | Herrick | Jan. 6, 1959 |
| 2,977,773 | De Kanter | Apr. 4, 1961 |
| 3,006,155 | Vanderlee | Oct. 31, 1961 |